(12) United States Patent
Wu

(10) Patent No.: US 11,540,624 B2
(45) Date of Patent: Jan. 3, 2023

(54) RETRACTABLE COLUMN STRUCTURE

(71) Applicant: TIMOTION TECHNOLOGY CO., LTD., New Taipei (TW)

(72) Inventor: Chou-Hsin Wu, New Taipei (TW)

(73) Assignee: TIMOTION TECHNOLOGY CO., LTD., New Taipei (TW)

( * ) Notice: Subject to any disclaimer, the term of this patent is extended or adjusted under 35 U.S.C. 154(b) by 227 days.

(21) Appl. No.: 17/094,031

(22) Filed: Nov. 10, 2020

(65) Prior Publication Data

US 2021/0052066 A1 Feb. 25, 2021

Related U.S. Application Data

(63) Continuation-in-part of application No. 15/467,143, filed on Mar. 23, 2017, now Pat. No. 10,876,561.

(30) Foreign Application Priority Data

Jan. 17, 2017 (TW) .................................. 106200852

(51) Int. Cl.
*F16B 7/10* (2006.01)
*A47B 9/20* (2006.01)

(52) U.S. Cl.
CPC ............ *A47B 9/20* (2013.01); *F16B 7/10* (2013.01); *F16B 7/105* (2013.01); *A47B 2200/0054* (2013.01); *A47B 2200/0056* (2013.01); *Y10T 403/32467* (2015.01)

(58) Field of Classification Search
CPC ..... A47B 9/00; A47B 9/20; A47B 2200/0051; A47B 2200/0052; A47B 2200/0054; A47B 2200/0059; Y10T 403/32467; Y10T 403/49; Y10T 403/4941; F16B 7/10;

(Continued)

(56) References Cited

U.S. PATENT DOCUMENTS

| 3,512,805 | A | * | 5/1970 | Glatz | .................. | F16L 25/0009 |
| | | | | | | 138/168 |
| 5,421,556 | A | * | 6/1995 | Dodge | .................... | E04H 17/20 |
| | | | | | | 403/375 |

(Continued)

FOREIGN PATENT DOCUMENTS

| DE | 20 2016 103 880 | * | 10/2017 | ................ | A47B 9/20 |
| EP | 3 339 684 | * | 6/2018 | ................ | A47B 9/04 |

*Primary Examiner* — Michael P Ferguson
(74) *Attorney, Agent, or Firm* — Chun-Ming Shih; HDLS IPR Services

(57) ABSTRACT

A retractable column structure includes a metal outer tubular member, a retaining bracket, and an inner tubular member. The outer tubular member includes a wall having outer, inner and end surfaces. The outer tubular member includes slots extending from the end surface to the inner surface. A rear end of each slot includes a hook protruding out of the inner surface. The retaining bracket includes a frame member abutted against the wall and locking hooks inserted into the inner surface and locked onto each corresponding hook. The inner tubular member moveably penetrates into the retaining bracket disposed between the tubular members and is concealed inside the outer tubular member. Accordingly, excellent support of inner and outer tubular members can be achieved for stable sliding therebetween.

6 Claims, 9 Drawing Sheets

(58) Field of Classification Search
CPC .... F16B 7/105; F16B 2/00; F16B 2/20; E04H 2017/006
See application file for complete search history.

(56) References Cited

U.S. PATENT DOCUMENTS

| | | | | |
|---|---|---|---|---|
| 5,931,450 | A * | 8/1999 | Yoder | E04H 12/2215 |
| | | | | 256/65.01 |
| 6,039,307 | A * | 3/2000 | De Zen | E04H 17/143 |
| | | | | 256/66 |
| 6,994,327 | B2 * | 2/2006 | Steffes | E04H 17/20 |
| | | | | 256/66 |
| 8,430,218 | B2 * | 4/2013 | Klinke | A47B 9/20 |
| | | | | 248/161 |
| 9,629,452 | B1 * | 4/2017 | Chen | A47B 9/20 |
| 10,876,561 | B2 * | 12/2020 | Wu | F16B 7/14 |
| 2008/0099654 | A1 * | 5/2008 | Bailly | E04F 21/18 |
| | | | | 248/644 |
| 2011/0180773 | A1 * | 7/2011 | Pacheco | E04H 17/20 |
| | | | | 72/347 |
| 2018/0303233 | A1 * | 10/2018 | DeGroot | A47B 9/20 |

* cited by examiner

RETRACTABLE COLUMN STRUCTURE

CROSS-REFERENCE TO RELATED APPLICATIONS

This application is a continuation-in-part application of U.S. application Ser. No. 15/467,143 filed on Mar. 23, 2017, and entitled "RETRACTABLE COLUMN STRUCTURE", which claims priority to TW106200852 filed on Jan. 17, 2017. The entire disclosures of the above applications are incorporated herein by reference.

BACKGROUND OF THE INVENTION

Field of the Invention

The present invention is related to a retractable column technique, in particular, to a retractable column structure.

Description of Related Art

Retractable columns are known to be applied to electric lifting tables as the table legs, which are able to not only satisfy the needs of different body shapes of users but also allow the users to adjust the heights of the table according to personal preferences in order to achieve the objective of comfort of use thereof. Accordingly, electric lifting tables with adjustable heights are one of the main trends of the modern design.

A known retractable column mainly comprises an outer tube and an inner tube penetrating through the internal of the outer tube, and it is connected the inner and outer tubes via a lead screw and a motor in order to form an electric lifting table leg.

To achieve the objective of the penetration fitting and cooperation, the outer and inner tubes used in the currently existing retractable column mostly adopt the design where the dimension of the inner edge of the outer tube is greater than the dimension of the outer edge of the inner tube in order to allow the inner tube to be able to penetrate into the internal of the outer tube with ease and to slide relative to each other. However, a gap of greater distance is formed between the walls of the inner tube and the outer tube such that it is likely cause the wobbling and instability between the inner tube and the outer tube.

In view of the above, it is an objective of the inventor to provide an improvement capable of overcoming the aforementioned drawbacks associated with the known arts after years of researches along with utilization of academic principles.

SUMMARY OF THE INVENTION

An objective of the present invention is to provide a retractable column structure capable of clamping a retaining bracket between an inner tubular member and an outer tubular member in order to allow the inner tubular members to obtain an excellent support and to achieve a stable sliding between the inner and outer tubular members.

To achieve the aforementioned objective, the present invention provides a retractable column structure, comprising a metal outer tubular member, a retaining bracket, and an inner tubular member. The metal outer tubular member includes a wall, and the wall includes an outer surface, an inner surface formed at an inner side of the outer surface and an end surface connected to the inner surface and the outer surface. The metal outer tubular member further comprises a plurality of slots formed via an extrusion method to extend from the end surface to the inner surface along an axial direction, and a rear end of each one of the slots formed via the extrusion method includes a hook formed to protrude out of the inner surface. The retaining bracket includes a frame member and a plurality of locking members extended from the frame member, the frame member abuts against the wall, and each one of the locking members is inserted into the inner surface and locked onto each one of the corresponding hooks respectively. The inner tubular member moveably penetrates into the retaining bracket and is concealed inside the metal outer tubular member, and the retaining bracket is disposed between the inner tubular member and the metal outer tubular member.

The present invention is of the following advantageous effects. By forming the slots at the internal of the outer tubular member, the outer surface of the outer tubular member can be of improved appealing appearance effect. By arranging the slots at the corners of the outer tubular member, all walls can be formed to have greater flatness and the resistance to deformation of the walls can be improved. By using the lip portions to abut against the outer wall of the inner tubular member and the recessed portions, the sliding between the inner and outer tubular members can be facilitated with smoothness. In addition, the present invention is of the merits of facilitated manufacturing process, stable quality, excellent reliability, and easy installation etc.

DETAILED DESCRIPTION OF THE INVENTION

Figure 1:
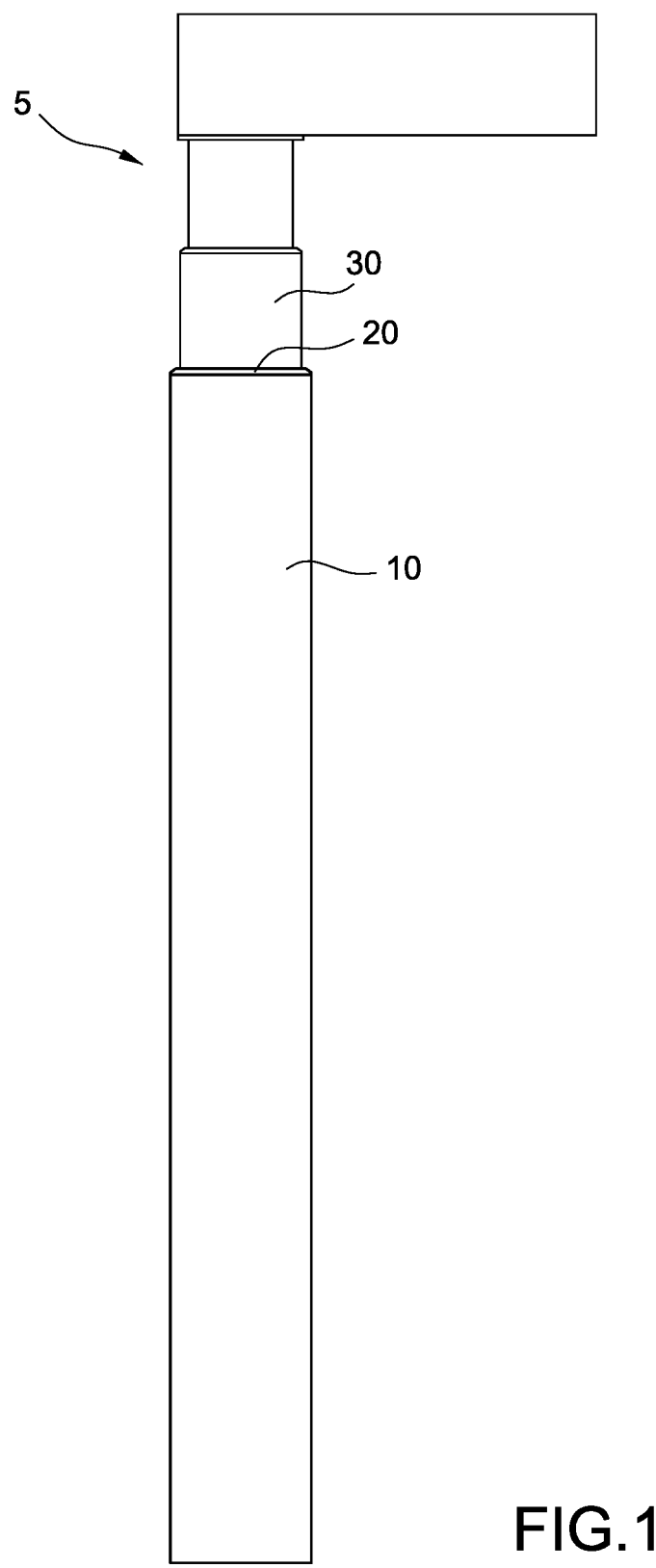
FIG. 1 is an assembly view showing a retractable column structure of the present invention applied to a table leg.
Figure 2:
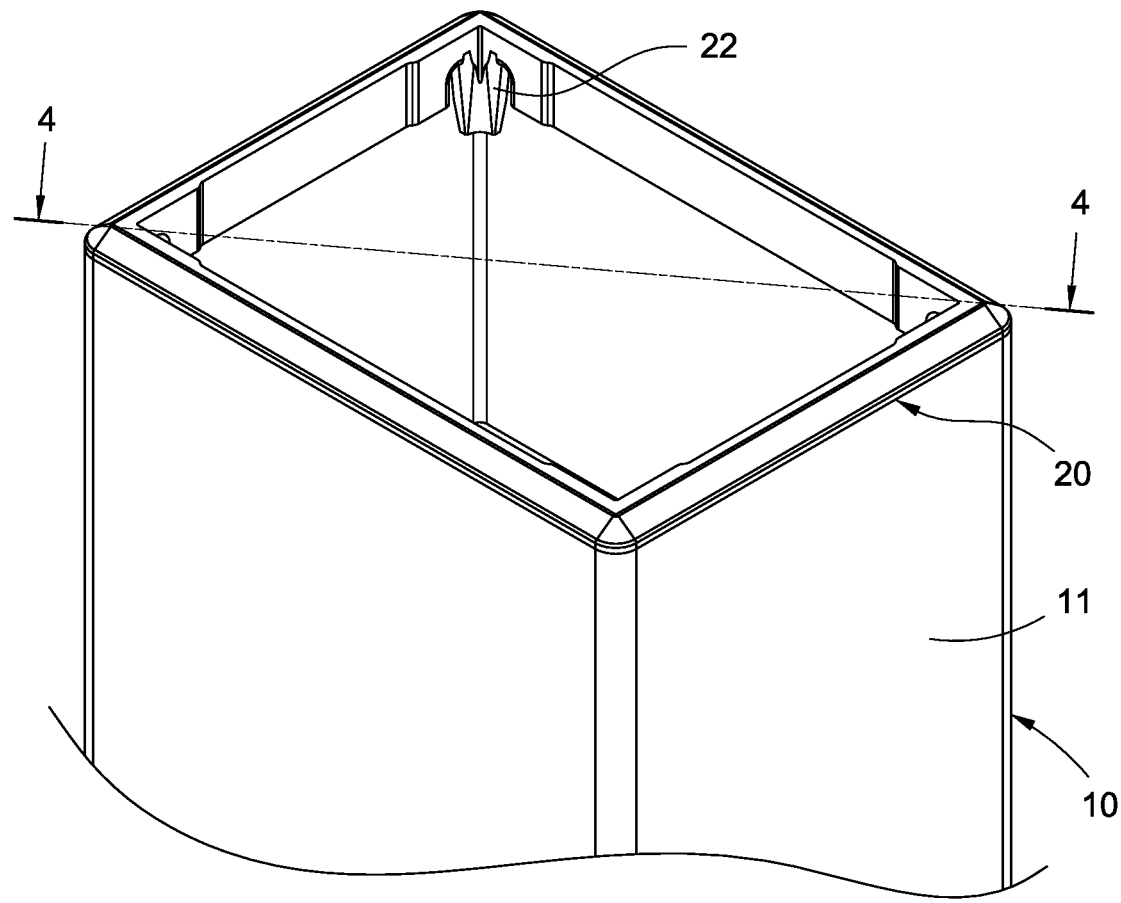
FIG. 2 is an assembly view of the metal outer tubular member and the retaining bracket of the present invention.
Figure 3:
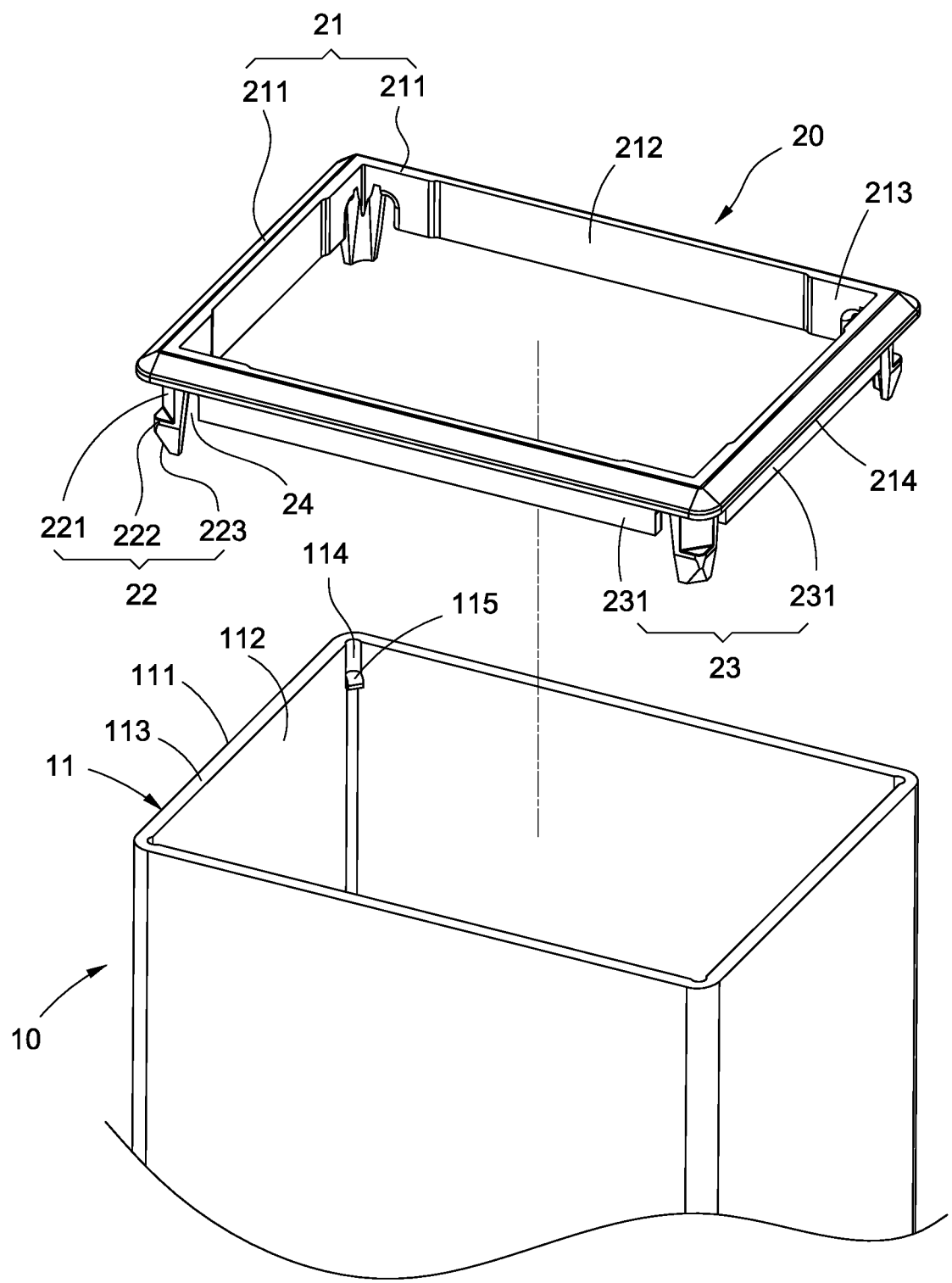
FIG. 3 is a perspective exploded view of the metal outer tubular member and the retaining bracket of the present invention.
Figure 4:
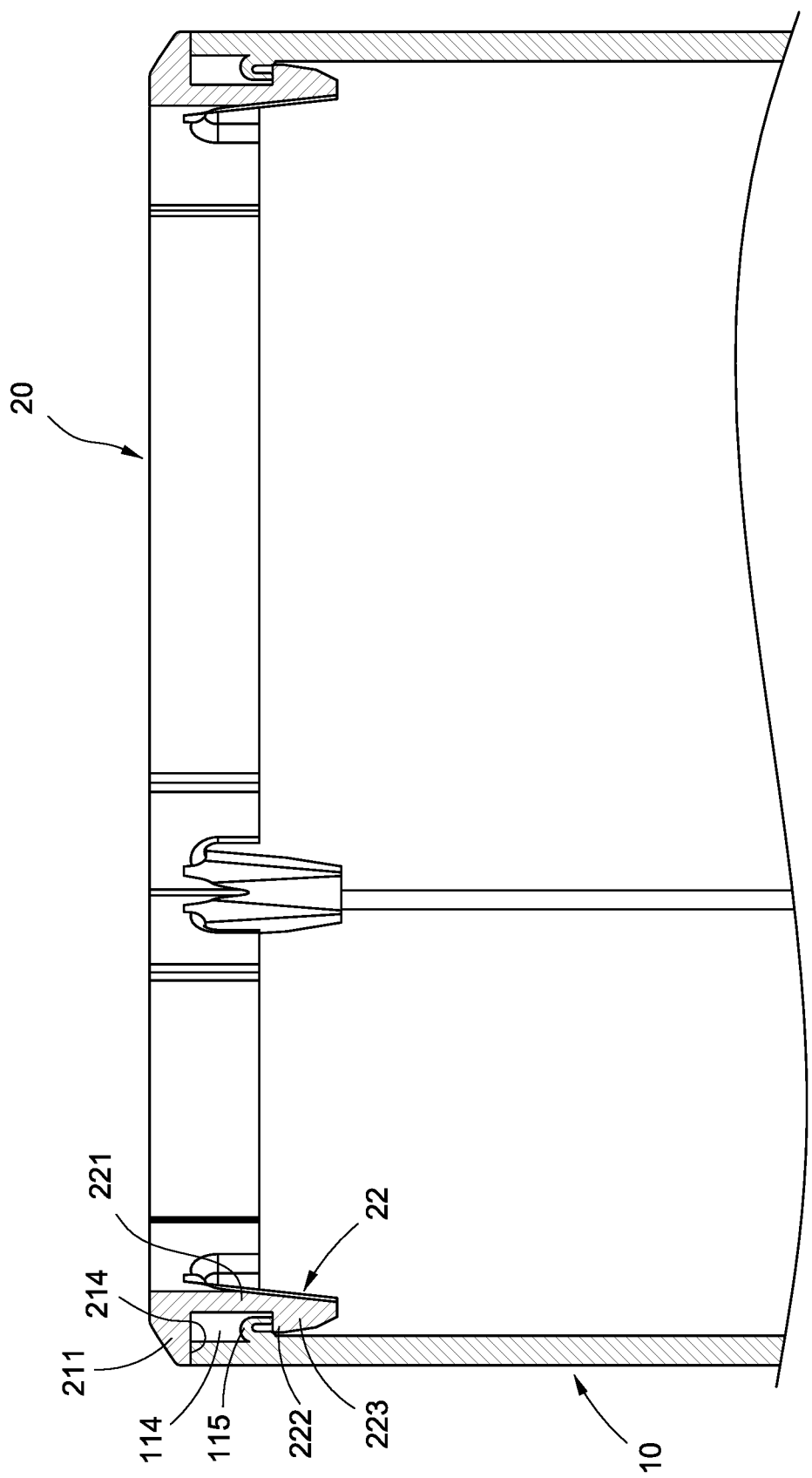
FIG. 4 is a cross sectional view taken along the line 4-4 in FIG. 2.
Figure 5:
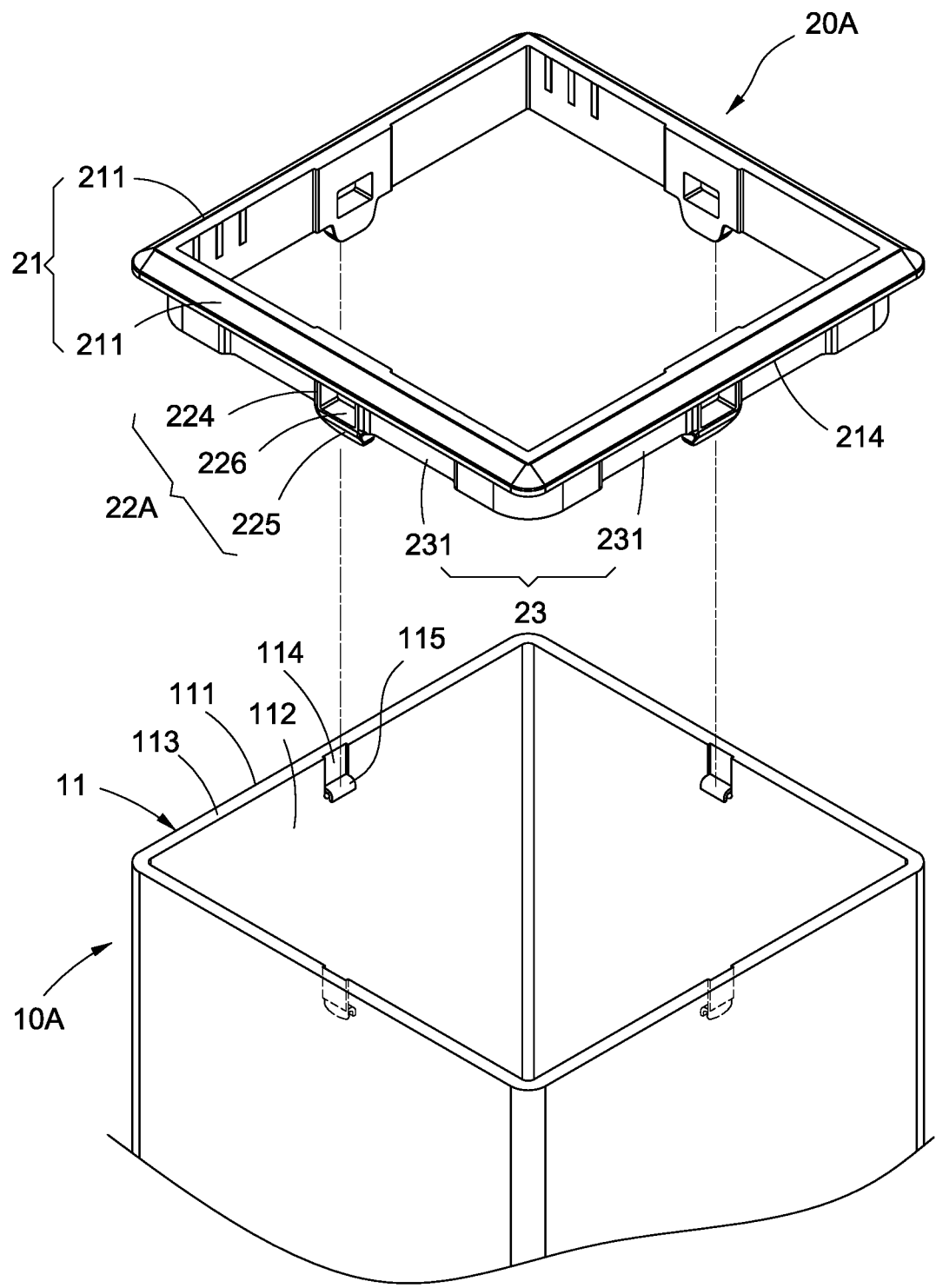
FIG. 5 is a perspective exploded view of another embodiment of the metal outer tubular member and the retaining bracket of the present invention.
Figure 6:
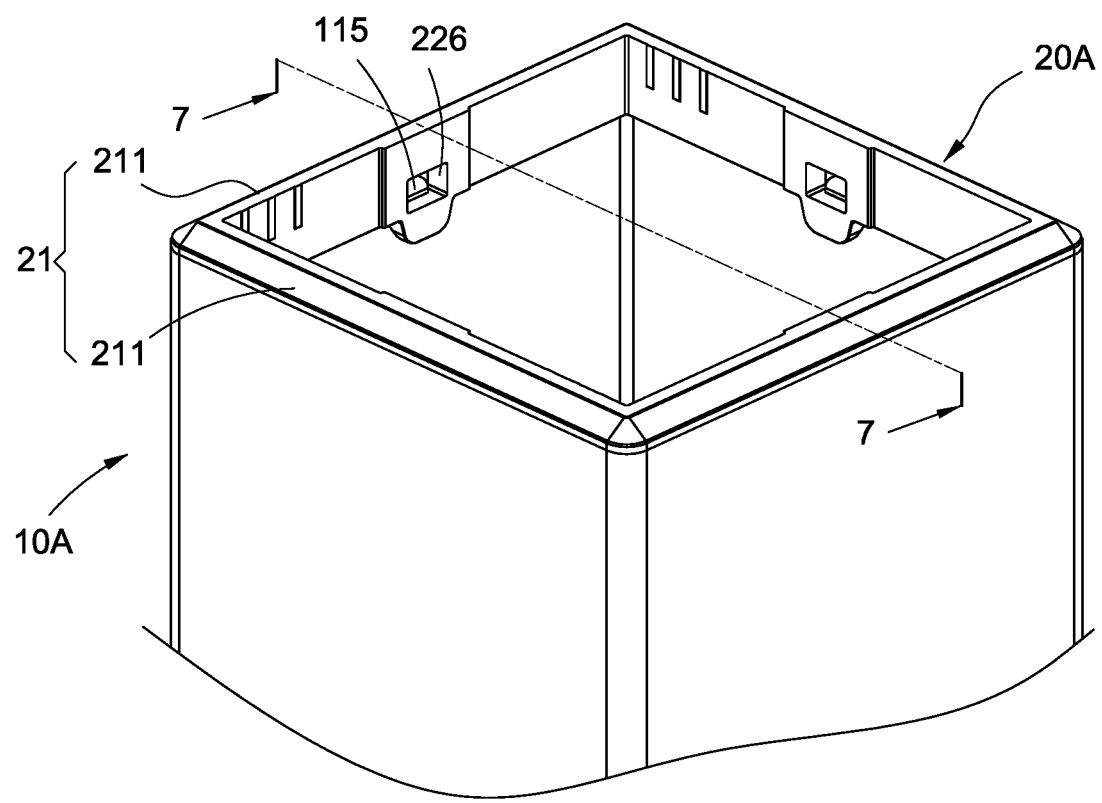
FIG. 6 is an assembly view of another embodiment of the metal outer tubular member and the retaining bracket of the present invention.
Figure 7:
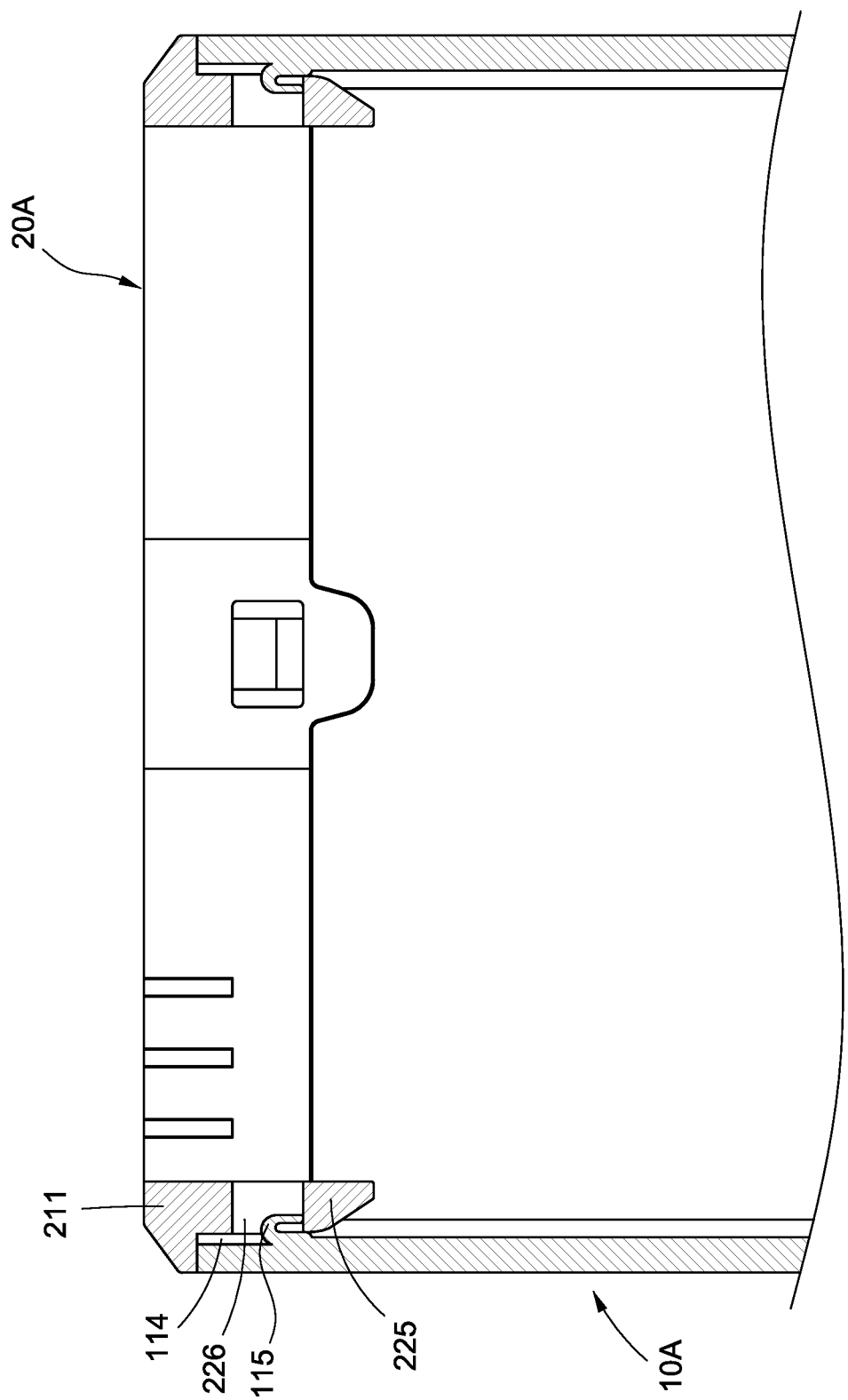
FIG. 7 is a cross-sectional view taken along 7-7 in FIG. 6.

The following provide a detailed description on the technical content of the present invention along with the accompanied drawings. However, it shall be understood that the drawings are provided for illustration purposes only rather than to limit the scope of the present invention.

Please refer to FIGS. 1 to 4. The present invention provides a retractable column structure, it is applied to a table leg 5 of an electric lifting table, and such retractable column structure mainly comprises a metal outer tubular member 10, a retaining bracket 20 and an inner tubular member 30.

The cross section of the metal outer tubular member 10 can be of a polygonal shape; however, it is not limited to such shape only. In this embodiment, the metal outer tubular member 10 is of a rectangular shape, which can be made of a metal material of aluminum and iron etc. The metal outer tubular member 10 is formed by four walls 11 circumferencing together, and such wall 11 includes an outer surface 111, an inner surface 112 formed at an inner side of the outer surface 111 and an end surface 113 connected to the inner surface 112 and the outer surface 111. The inner surface 112 and the outer surface 111 are parallel to each other, and the end surface 113 is perpendicular to the inner surface 112 and the outer surface 111.

The metal outer tubular member 10 further comprises a plurality of slots 114 formed to extend from the end surface 113 to the inner surface 112 along an axial direction, and the rear end of each one of the slots 114 is formed of a hook 115 protruding out of the inner surface 112; wherein the slots 114 and the hooks 115 are formed by a pressing method and are arranged to be parallel with the central line of the metal outer tubular member 10. In this embodiment, each one of the slots 114 is formed at a corner where the walls 11 are connected to each other. Accordingly, with such structure, the walls 11 can be effectively prevented from improper condition of deformation due to the effect of external forces such that the structural strength can be increased.

The retaining bracket 20 can be made of a soft material of, such as, plastic, and it can include a frame member 21 and a plurality of locking members 22. In this embodiment, the frame member 21 is a square frame formed by a plurality of frame strips 211 connected to each other. The middle section of the inner side of each one of the frame strips 211 is formed of a recessed portion 212, and a front section and a rear section thereof include a lip portion 213 formed thereon. In addition, the outer side of the frame strip 211 is formed of a contact surface 214 abutted against the end surface 113.

In this embodiment, the locking member 22 is a locking hook. Each one of the locking members 22 is formed to extend downward from each corner of the frame member 21, and each one of the locking hooks 22 includes a supporting arm 221 extended from the frame strip 211 and a hook portion 222 extended from the supporting arm 221 such that when the contact surface 214 of the frame strip 211 abuts against the aforementioned end surface 113, the hook portion 222 is locked and positioned corresponding to the hook 115. Furthermore, a lower section of the hook portion 222 includes a guiding oblique surface 223 formed thereon.

Moreover, the retaining bracket 20 further comprises a skirtboard 23. In this embodiment, the skirtboard 23 is formed by circumferencing a plurality of slabs 231 together, and each one of the slabs 231 extends downward from the frame strip 211 and is formed between two of the locking hooks 22 adjacent to each other. In addition, a cut-out portion 24 is formed between the slab 231 and the locking hook 22 in order to increase the elastic deformation capability of each locking hook 22.

In this embodiment, the cross section of the inner tubular member 30 can also be of a polygonal shape. The metal outer perimeter dimension of the inner tubular member 30 is smaller than the inner perimeter dimension of the metal outer tubular member 10; therefore, the inner tubular member 30 is able to moveably penetrate into the retaining bracket 20 and concealed inside the metal outer tubular member 10. The retaining bracket 20 is disposed between the inner tubular member 30 and the metal outer tubular member 10, which is also clamped by the inner tubular member 30 and the metal outer tubular member 10 together; wherein the retaining bracket 20 uses the lip portions 213 to commonly abut against the outer wall of the inner tubular member 30.

Furthermore, the inner tubular member 30 can also be configured to have the structure similar to the aforementioned metal outer tubular member 10 in order to allow another tubular member of a smaller dimension (as shown in FIG. 1) for penetrating therethrough and concealing therein such that a three-staged retractable column structure is constructed.

During the assembly, the retaining bracket 20 shall be installed corresponding to the opening end of the metal outer tubular member 10, and each locking member 22 is inserted inward along the slots 114. Once the guiding oblique surface 223 touches the hook 115 of the hook portion 222, the locking member 22 generates an elastic deformation toward the rear side, and after the retaining bracket 20 is pushed toward the internal of the metal outer tubular member 10, the hook portion 222 is locked and positioned corresponding to the hook 115. Finally, the inner tubular member 30 penetrates into the metal outer tubular member 10 toward the retaining bracket 20 and is concealed therein.

Please refer to FIGS. 5 to 8. In addition to the aforementioned embodiment, the retractable column structure of the present invention can also be of the configuration as described in another embodiment as follows. The slots 114 of the metal outer tubular member 10A can be positioned at the central areas of the walls 11, and the slots 114 can also be formed via a pressing method. Furthermore, the rear end of each slot 114 can include a hook 115 formed to protrude out of the inner surface 112. Each one of the locking members 22A of the retaining bracket 20 can also be formed to extend downward from the central area of the frame member 21 and arranged corresponding to the aforementioned hook 115. The locking member 22A includes a rectangular piece 224 extended from the frame strip 211 and a trapezoid piece 225 extended from the rectangular piece 224. A through hole 226 is formed in the rectangular piece 224. Therefore, when the contact surface 214 of the frame strip 211 abuts against the end surface 113, the hook 115 is locked in position corresponding to the through hole 226.

Figure 8:
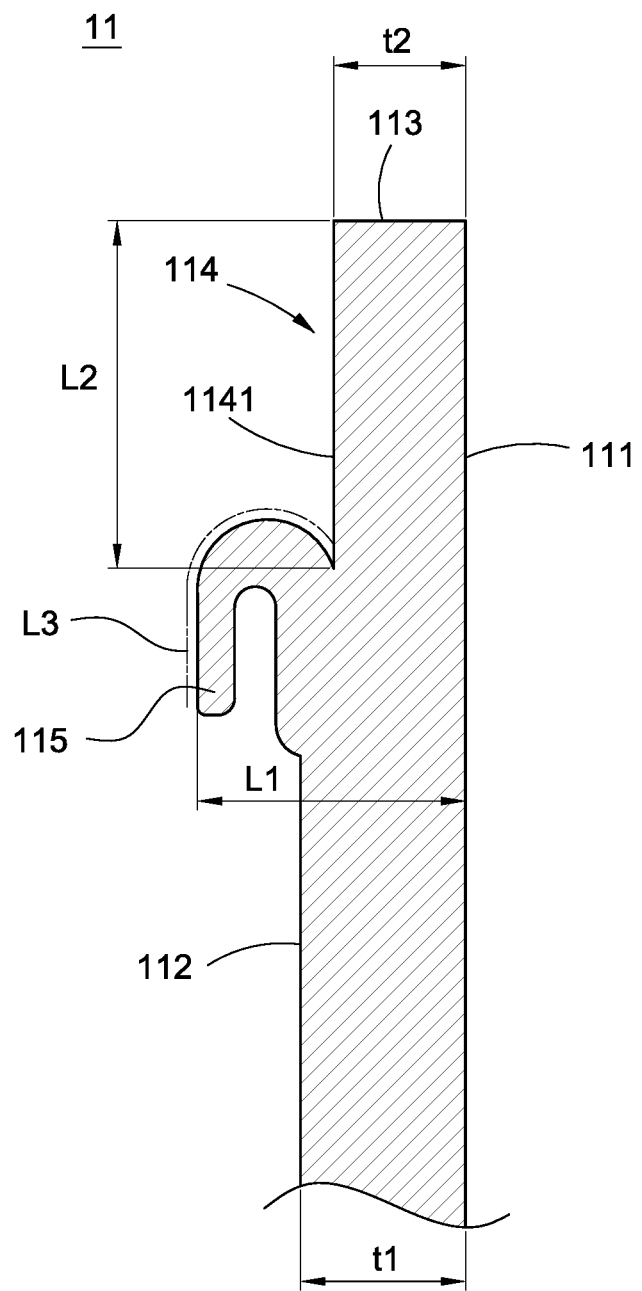
FIG. 8 is a partial cross-sectional view of the metal outer tubular member of the present invention.

Please refer to FIG. 8 for further illustration. A thickness t1 is formed between the outer surface 111 and the inner surface 112 of the wall 11 of the metal outer tubular member 10A. In some embodiments, the value of the first thickness t1 is approximately between 1.2 mm and 2.7 mm. The slot 114 includes a slot bottom surface 1141, and a second thickness t2 is formed between the outer surface 111 and the slot bottom surface 1141. In some embodiments, the value of the second thickness t2 is approximately between 0.5 mm and 2.4 mm. The first thickness t1 is greater than the second thickness t2.

Furthermore, a first length L1 is formed between the outer surface 111 and the hook 115. In some embodiments, the value of the first length is approximately between 1.7 mm and 3.2 mm. The first length L1 is greater than the first thickness t1.

Moreover, a second length L2 is formed between the end surface 113 and the root portion of the slot 114. In some embodiments, the value of the second length L2 is approximately between 2.0 mm and 3.5 mm. A first arc length L3 is formed at the outer perimeter of the hook 115. The first arc length 13 is substantially equal to the second length L2. In addition, the volume of the hook 115 is substantially equal to the capacity of the slot 114.

Figure 9:
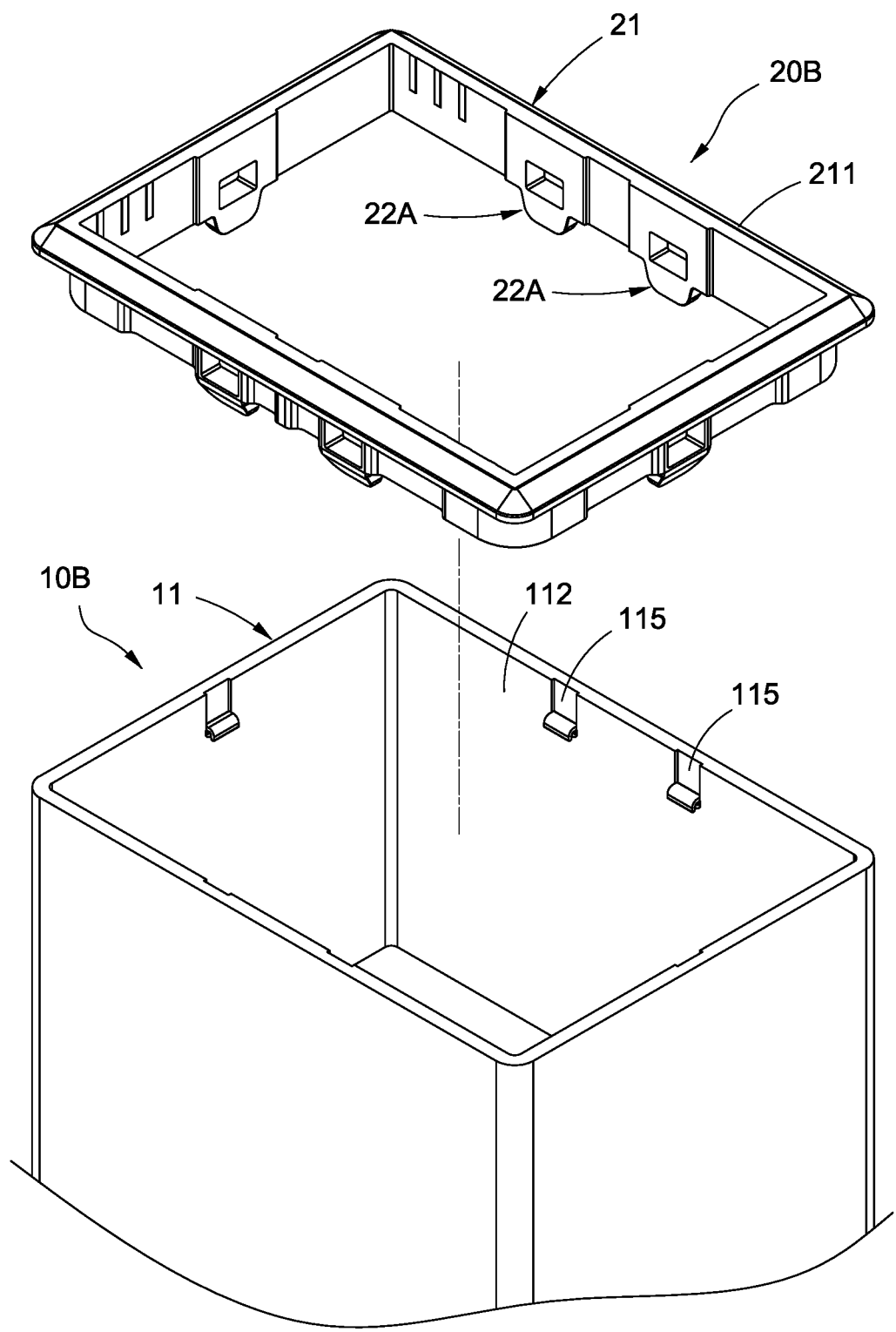
FIG. 9 is a perspective exploded view of another embodiment of the metal outer tubular member and the retaining bracket of the present invention.

Please refer to FIG. 9, the difference between the retractable column structure of this embodiment and the aforementioned second embodiment relies in: two hooks 115 may be formed via the extrusion method on the same inner surface 112 of one side board of the wall 11 of the metal tubular member 10B. Similarly, two locking members 22A are extended from the same frame strip 211 of the retaining bracket 20B. Consequently, when the contact surface 214 of the frame strip 211 abuts against the end surface 113, each one of the hooks 115 is locked in position corresponding to each one of the through holes 226 respectively.

In view of the above, the retractable column structure of the present invention is able to achieve the expected objectives of use and to overcome the drawbacks of known arts. In addition, the above description is to illustrate the exemplary embodiments of the present invention only, which shall not be treated as limitations to the claims of the present invention, and other equivalent modifications utilizing the spirit of the patent of the present invention shall all be deemed to be within the scope of the claims of the present invention.

What is claimed is:

1. A retractable column structure, comprising:
    a metal outer tubular member having a wall, and the wall having an outer surface, an inner surface formed at an inner side of the outer surface and an end surface connected to the inner surface and the outer surface, the metal outer tubular member further comprising a plurality of slots formed via an extrusion method to extend from the end surface within the inner surface along an axial direction, each one of the slots formed via the extrusion method having a rear end, the rear end having a hook formed by the extrusion method to protrude toward a direction away from the slot, wherein material from the inner surface is pressed in an axial direction extending from the end surface to form an open-end of each slot and axially-deformed towards the rear end of the slot to form the slot therein, and the axially-deformed material is deformed radially-inward at the rear end to form the hook;
    a retaining bracket having a frame member and a plurality of locking members extended from the frame member, the frame member abutted against the wall, each one of the locking members inserted into the inner surface and locked onto a corresponding one of the hooks respectively; and
    an inner tubular member moveably penetrating into the retaining bracket and concealed inside the metal outer tubular member, the retaining bracket disposed between the inner tubular member and the metal outer tubular member.

2. The retractable column structure according to claim 1, wherein each of the slots comprises a slot bottom surface, a first thickness between the outer surface and the inner surface of the wall is greater than a second thickness between the outer surface and the slot bottom surface.

3. The retractable column structure according to claim 2, wherein a first length between the outer surface and an inner side surface of the hook is greater than the first thickness.

4. The retractable column structure according to claim 1, wherein a first thickness between the outer surface and inner surface of the wall is greater than a first length between the outer surface and an inner side surface of the hook.

5. The retractable column structure according to claim 1, wherein a second length between the end surface and a root portion of the slot is substantially equal to a first arc length at an outer perimeter of the hook.

6. The retractable column structure according to claim 1, wherein a volume of the hook is substantially equal to a capacity of the slot.

\* \* \* \* \*